No. 858,380. PATENTED JULY 2, 1907.
J. T. GILMER.
SAP AND GUM EXTRACTOR.
APPLICATION FILED OCT. 17, 1906.
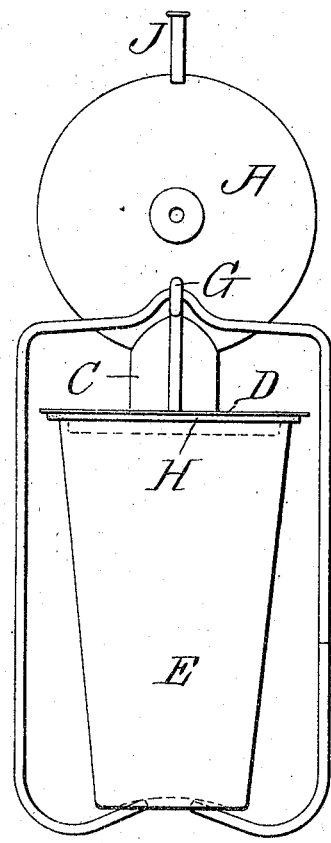
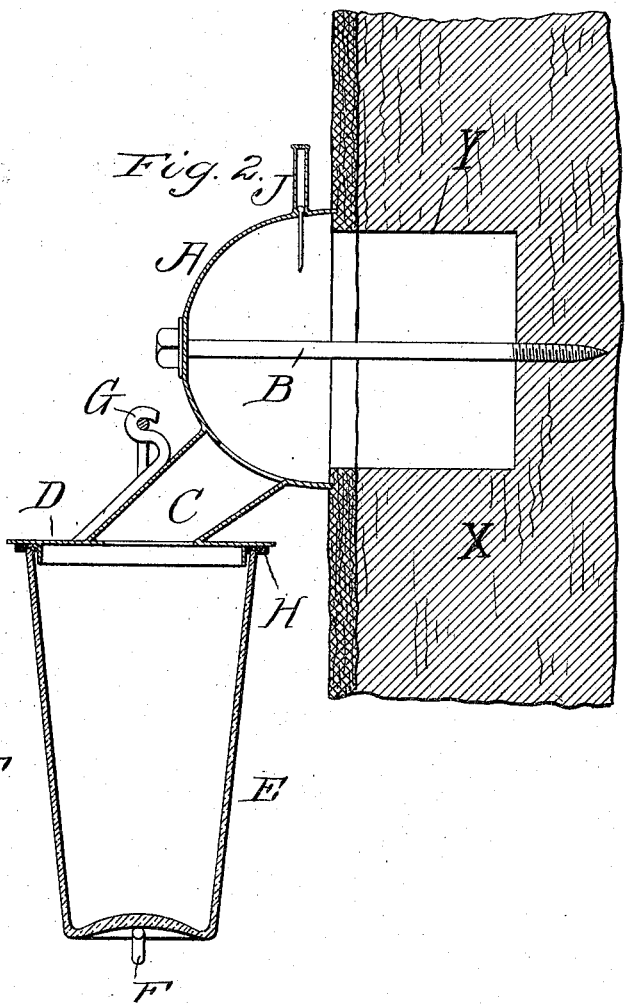

UNITED STATES PATENT OFFICE.

JOHN T. GILMER, OF PENSACOLA, FLORIDA.

SAP AND GUM EXTRACTOR.

No. 858,380.　　　　　Specification of Letters Patent.　　　　　Patented July 2, 1907.

Application filed October 17, 1906. Serial No. 339,392.

*To all whom it may concern:*

Be it known that I, JOHN T. GILMER, a citizen of the United States, residing at Pensacola, in the county of Escambia and State of Florida, have invented certain new and useful Improvements in Sap and Gum Extractors; and I do hereby declare the following to be a full, clear, and exact description of the invention, such as will enable others skilled in the art to which it appertains to make and use the same.
This invention is an improved device for use in extracting sap or gum from maple, pine and other gummiferous trees, more especially for drawing or extracting, receiving and retaining gum from pine trees, for the production of rosin and turpentine.
The principal objects are: (1) to increase the efficiency and at the same time materially simplify and cheapen the methods and apparatus employed in gum extraction; (2) to avoid the scarification of the bodies of the trees incident to the former method of "boxing", "hacking" and "scraping", thereby preserving the timber from destruction by continued boxing, while incidentally diminishing the liability of forest fires which are sometimes caused by ignition of the rosin which is deposited upon the surfaces of marred or hacked trees; (3) to provide for receiving the sap or gum, directly as it exudes from the wood, and retaining the same in an air and water-tight inclosure until the final collection or "dipping" process; (4) to house the sap-hole of the tree where it is bored or tapped, protecting it from the weather, preventing the congestion of the pores of the wood from cold or frost, thus promoting the freer flow or exudence of the sap or gum, as well as protecting it from rain, dirt and the like; (5) to eliminate the usual wastage due to overflow, evaporation and drying, washing away of soft gum by rain, and other causes of wastage in present methods of gathering the gum, thus recovering a larger quantity of gum; and (6) to obtain, by the foregoing means, a better and purer quality of gum such as will yield finer grades of rosin and spirits of turpentine as well as greater proportions thereof.

With the foregoing in view, the invention will hereinafter be fully described by reference to the accompanying drawings, which form a part of this specification, and will then be more particularly pointed out and defined in the appended claims.

Figure 1 of said drawings is a front elevation of a device embodying my invention. Fig. 2 is a central vertical section of the same, showing the mode of applying the device to a tree that is to be sapped.

In the illustrated device, A designates a cup-shaped or hemispherical disk, preferably of sheet-metal, designed to be applied as a cap or cover over a hole bored out in the side of the tree that is to be sapped, as represented in Fig. 2. By means of a lag-bolt or screw B, inserted through the center of the disk or cap A and of sufficient length to engage in the wood at the back of the hole, the said disk or cap is securely clamped in place, with its rim cutting or embedding in the bark or outer surface of the tree, making a weather-tight closure over the hole into which the sap or gum exudes from the pores of the tree. The cup-like disk or cap constitutes the upper or inner part of a spout C, shown projecting downwardly and forwardly from the lower side of said cap. The lower or outer end or foot of said spout is provided with a flange D, constituting a foot plate. This plate, offset from the disk or cup-like inner end of the spout, serves as a cover for a vessel E, desirably an opentopped glass, which receives and contains the sap or gum discharged from the sap-hole through the spout. Said glass or vessel E is engaged below and supported by a stirrup F, the latter being loosely held by a hook G soldered or otherwise attached to the front or upper side of the spout C. Said stirrup F, consisting preferably of a continuous piece of steel wire, possesses sufficient spring or resiliency to clamp the vessel tightly to its cover-plate or flange D, while yet permitting the vessel to be readily introduced into or detached or withdrawn from its holder. A rubber ring or gasket H, interposed between the rim of the vessel and the cover-plate or flange D, renders both the extractor and the vessel air-tight. Incidentally, it will be noted that the gasket H is shown arranged around an annular flange on the under side of the plate D, thus retaining the gasket in position, besides affording a means for properly centering the top of the glass or vessel E in respect to the cover-plate. It will be further observed that a small vent-valve J is provided at the upper side of the cup-like disk or cap A, said valve consisting of an upright tube having a vent or perforation in its upper end and containing a headed pin gravitally seated in an aperture in the wall of the disk. This valve permits escape of air, when expanded by the action of the sun's rays, but the valve prevents ingress of cold air which would congest the pores of the tree and retard the flow of the sap.

In applying the device to the tree, it is merely necessary to bore a smooth, straight auger-hole in the side of the tree, the outer surface of the bark first having been planed or made flat. This is represented in Fig. 2, wherein X denotes a portion of the body of a tree having an auger-hole Y bored in its side. The hole Y should be bored a little smaller than the rim of the cup-like disk, say from two to three and a half inches in diameter; and of sufficient depth, say from two and a half to three and a half inches, to cause free flow of the sap or gum. Aside from boring such hole, and planing off a small portion of the outer surface of the bark, there is no mutilation or marring of the body of the tree, and no scarification such as that incident to the former method of boxing and hacking or scarring. This of course preserves the timber, preventing the destruction of the trees due to continued boxing and scarring, besides avoiding the accumulation of rosin on the outer surface of the body of the trees, where the rosin is more readily liable to ignition, this being one of the sources of forest-fires. After the hole is bored, the cup-like disk or cap A is then centered and clamped over the hole, as hereinbefore described, the lag-bolt B being tightened to cause the rim or edge of the disk to bite into the bark or outer surface of the tree. The sap-hole being covered and housed, is not only free from intrusion of dirt, dust, chips and bark, but is also protected against the weather, particularly from the effects of cold or frost, thus promoting the free flow of sap or gum; besides which all the gum is received into the cap and discharged therefrom into the receiving and retaining vessel, so there can be no overflow. Nor is the sap or gum liable to drying or evaporation by exposure to the air, sun and heat, it being remembered that both the extractor or cap and receiving vessel attached thereto are made substantially air-tight and water-tight. Through the saving of wastage due to these usual causes, probably from forty to fifty percentum more of gum is recovered than by the old method of boxing and scraping. The frequent wastage caused by the flow or washing off of soft gum by rains from "boxed" timber is likewise completely overcome. Furthermore, being free from foreign matter, and from exposure to the weather, a purer and better quality of gum is obtained, yielding finer grades of rosin and clearer grades of spirits of turpentine; while, in addition, the relative yields of both the rosin and the spirits of turpentine are greatly increased for equal amounts of gum.

In use, when the receiving glass or vessel E is full, or when it is desirable to remove the same, as for collecting or "dipping", it is merely necessary to press apart the clamp-spring of the stirrup F and detach the vessel, either substituting another in its stead, or else leaving the cap attached to the tree until the same vessel is replaced.

The advantages incident to the process, as above outlined, the direct collection of the sap or gum as it comes from the tree and its preservation unexposed to the air, weather or other elements, increases the efficiency of the operation; while the simplicity and small cost of the device, and the ease and expedition with which it can be applied and used, and with which it can be dipped, materially cheapen, simplify and improve the work of gum or sap extraction.

I do not limit myself to the specific construction shown herein, the same being susceptible of various modifications and changes in details. For example, the vessel E could be made to screw to the cover-plate D, or so as to be bolted thereto, or otherwise supported or clamped to the cover-plate. Again, the general form of the combined cap, spout and foot-plate may be changed, the spout being made, for instance, as a part of the disk and having a flange at its lower end, taking the place of the foot-plate; all of which will be included within the scope of the following claims.

Having thus described my invention, what I claim as new and desire to secure by Letters Patent of the United States is:—

1. A sap or gum extractor comprising a cup-like disk or cap adapted to be applied as a cover over a sap-hole in a tree, the rim of said disk adapted to bite or embed in the outer surface of the tree around the sap-hole, said disk having an outwardly-projecting spout, provided with a flange or foot-plate, means for securing said disk on or to the tree, a detachable sap or gum receiving and containing vessel, and means for holding said vessel with its mouth against said flange or foot-plate to receive the sap or gum gathered into said disk or cap.

2. A sap or gum extractor comprising a spout having its inner end formed as or provided with an enlarged cup-like cap to cover a sap-hole in a tree and having its outer or discharge end provided with a flange, a lag-screw inserted centrally through said cap from the outside adapted to engage the bottom of the sap-hole for fastening said cap thereover, a sap or gum receiving vessel, and means for holding said vessel with its mouth against said flange.

3. A sap or gum extractor comprising a spout whose inner end constitutes a cap for applying as a cover over a tap-hole in a tree, said spout being provided with a flange, and a depending stirrup adapted for holding a sap or gum receiving vessel, said stirrup possessing sufficient spring or elasticity to clamp the mouth of said vessel against said flange.

4. A sap or gum extractor comprising a tubular discharge spout for attachment to a tap-hole and provided with a flanged discharge end and a depending stirrup for holding a sap or gum receiving vessel with its mouth against the said flanged discharge end of said spout.

5. A sap or gum extractor comprising a spout having its inner end provided with a cap for covering a sap-hole and having its outer end provided with a flange, said spout having a hook and a depending spring stirrup supported thereby, said stirrup adapted to hold a sap-receiving vessel and clamp its mouth against said flange.

6. A sap or gum extractor of the character described made of sheet-metal and comprising a hemispherical disk or cap having a spout projecting outwardly from its convex side and provided with a foot-flange.

In testimony whereof I affix my signature, in presence of two witnesses.

JOHN T. GILMER.

Witnesses:
PAT EAGAN,
L. M. WAITE.